United States Patent Office 2,903,368
Patented Sept. 8, 1959

---

2,903,368

STABILIZATION OF ORGANIC COMPOUNDS

Ralph B. Thompson, Hinsdale, Ill., assignor, by mesne assignments, to Universal Oil Products Company, Des Plaines, Ill., a corporation of Delaware No Drawing. Application July 20, 1956
Serial No. 598,984

17 Claims. (Cl. 99—163)

This invention relates to the stabilization of organic compounds which tend to deteriorate in storage or in use due to oxidation or other reactions.

The novel method of the present invention is utilized for the stabilization of various organic materials which are unstable in storage, during treatment and/or in use, and include motor fuel, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen, with the resultant formation of undesirable gum, discoloration, rancidity and/or other deleterious reaction product.

The invention is particularly applicable to the stabilization of motor fuel and still more particularly unsaturated gasolines including cracked gasoline, polymer gasoline, etc. In storage or during transportation and/or treatment, these unsaturated gasolines tend to form undesirable gums and/or undergo discoloration. The invention is also applicable to the treatment of aviation gasolines which tend to undergo deterioration due to the addition of tetraethyl lead fluid or due to other components in the gasoline.

The invention is also particularly applicable to the stabilization of edible and inedible fats and oils, which may be of animal, vegetable or mineral origin and which tend to become rancid especially during long periods of storage prior to use. Typical representatives of the edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc. In still another embodiment the inhibitor may be incorporated in materials which contact food products as, for example, paraffin wax used to coat containers for food products, cardboard or other paper products used for packaging food products, etc.

In one embodiment the present invention relates to a method of stabilizing an organic material against deterioration which comprises incorporating therein an inhibitor selected from the group consisting of 1,4-dihydroxy-5,8-ethanohydronaphthalene and mono-ethers thereof.

In a specific embodiment the present invention relates to a method of stabilizing a fatty material which comprises incorporating therein from about 0.0001% to about 1% by weight of 1,4-dihydroxy-5,8-ethano-5,6,7,8-tetrahydronaphthalene.

In another specific embodiment the present invention relates to a method of stabilizing cracked gasoline which comprises incorporating therein from about 0.0001% to about 1% by weight of 1-hydroxy-4-methoxy-5,8-ethano-5,6,7,8-tetrahydronaphthalene.

The preferred inhibitors of the present invention are represented by the following general structures:

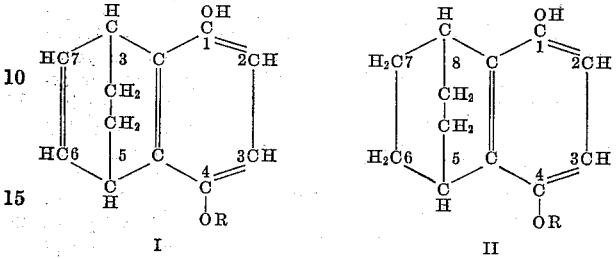

in which R is hydrogen, hydrocarbon or a substituted hydrocarbon group, and preferably an alkyl group containing from 1 to 4 carbon atoms, the latter being referred to herein as lower alkyl. The hydrocarbon group includes alkyl, alkenyl, cycloalkyl, cycloalkylalkyl, alkylcycloalkyl, aryl, aralkyl, alkaryl, etc. The substituted hydrocarbon group includes groups containing oxygen, nitrogen and/or sulfur. It is understood that one or both of the rings also may contain one or more substituents attached thereto, the substituents preferably being selected from those hereinbefore set forth and preferably comprising an alkyl group.

Referring to the general structure illustrated above, where R is hydrogen, structure I illustrates 1,4-dihydroxy-5,8 - ethano - 5,8 - dihydronaphthalene. Where R is an alkyl group, structure I illustrates a 1-hydroxy-4-alkoxy-5,8-ethano-5,8-dihydronaphthalene. Preferred inhibitors in this class include 1 - hydroxy - 4 - methoxy - 5,8 - ethano - 5,8 - dihydronaphthalene, 1 - hydroxy - 4 - ethoxy - 5,8 - ethano - 5,8 - dihydronaphthalene, 1 - hydroxy - 4 - propoxy - 5,8 - ethano - 5,8 - dihydronaphthalene, 1 - hydroxy - 4 - butoxy - 5,8 - ethano - 5,8 - dihydronaphthalene, etc.

Referring again to the general structure illustrated above, where R is hydrogen, structure II illustrates 1,4-dihydroxy - 5,8 - ethano - 5,6,7,8 - tetrahydronaphthalene. Where R is an alkyl group, structure II illustrates a 1-hydroxy - 4 - alkoxy - 5,8 - ethano - 5,6,7,8 - tetrahydronaphthalene. Preferred inhibitors in this class include 1 - hydroxy - 4 - methoxy - 5,8 - ethano - 5,6,7,8 - tetrahydronaphthalene, 1 - hydroxy - 4 - ethoxy - 5,8 - ethano - 5,6,7,8 - tetrahydronaphthalene, 1 - hydroxy - 4 - propoxy - 5,8 - ethano - 5,6,7,8 - tetrahydronaphthalene, 1 - hydroxy - 4 - butoxy - 5,8 - ethano - 5,6,7,8 - tetrahydronaphthalene, etc.

It is understood that the inhibitors of the present invention may comprise the specific compounds named herein, as well as these compounds in admixture with various isomers thereof. For example, in the dihydro compounds, the isomers may comprise corresponding compounds in which the double bond has shifted from the 6–7 position to the 5–6 or 7–8 positions and/or those in which the hydroxy and alkoxy groups have interchangeable positions with respect to an alkyl group. In the tetrahydro compounds, the isomers generally will be of the latter type. It also is understood that mixtures of dihydro and tetrahydro compounds and/or mixtures of the dihydroxy and mono-ethers may be employed.

The different inhibitor compounds which may be prepared and used in accordance with the present invention are not necessarily of equivalent potency in all or the same substrate. The specific inhibitor compound to be used is selected with regard to the particular substrate in which it is being used. For example, as will be shown by the data in the following examples, the mono-ether derivatives are especially effective in gasoline, while in lard the dihydroxy compounds or the mono-ethers are of substantially equal effectiveness.

The inhibitor of the present invention may be prepared in any suitable manner. In one method, 1,4-dihydroxy-5,8-ethano-dihydronaphthalene is prepared by the Diels-Alder reaction of cyclohexadiene with quinone. 1,4-dihydroxy-5,8-ethano-5,6,7,8-tetrahydronaphthalene is prepared by catalytically reducing 1,4-dihydroxy-5,8-ethano-5,8-dihydronaphthalene. The methyl-ethers are prepared by reacting 1,4-dihydroxy-5,8-ethano-5,8-dihydronaphthalene or 1,4-dihydroxy-5,8-ethano - 5,6,7,8 - tetrahydronaphthalene with a suitable methylating agent as, for example, dimethyl sulfate, generally at a temperature within the range of 150° to 175° F. It is understood that the inhibitors may be prepared in any other suitable manner.

The inhibitor compound of the present invention generally is incorporated in the organic material to be stabilized in an amount of below about 1% by weight and preferably in an amount within the range of from about 0.0001% to about 1% by weight and more particularly in a concentration of from about 0.001% to about 0.1% by weight. When used in gasoline, it is understood that the inhibitor compound may be utilized in conjunction with various dyes, synergists, metal deactivators, antiknock agents, such as tetraethyl lead, iron carbonyl, etc., rust inhibitors, etc. When used in fatty material, the inhibitor compound may be used in conjunction with synergists such as citric acid, phosphoric acid, ascorbic acid, etc., and/or in combination with other inhibitors and other compounds added for specific purposes. The inhibitor may be utilized as such or in a suitable solvent, including hydrocarbons, alcohols, glycols, ethers, ketones, etc. When desired, the inhibitor compound may be marketed as a solution along with other additives to be incorporated in the organic materials.

The following examples are introduced to illustrate further the novelty and utility of the present invention but not with the intention of unduly limiting the same.

The inhibitor compounds reported in Examples I through VI were prepared in the following manner. Cyclohexadiene-quinone was prepared by the Diels-Alder reaction of 6 grams of quinone and 18 grams of cyclohexadiene dissolved in 40 cc. of benzene. The mixture was allowed to stand for two days. The solvent then was evaporated and the product was recrystallized from hexane. It had a melting point of 208° F. 1,4-dihydroxy-5,8-ethano-dihydronaphthalene was prepared by suspending 3 grams of cyclohexadiene-quinone in 5 cc. of glacial acetic acid and then adding 3 drops of a 50–50 mixture of HBr (50%) and acetic acid. The mixture was warmed slightly until everything went into solution, and then the solution was allowed to cool. The precipitate was filtered and recrystallized. The product had a melting point of 348–352° F.

1-hydroxy-4-methoxy-5,8-ethano - dihydronaphthalene was prepared from the 1,4-dihydroxy-5,8-ethano-dihydronaphthalene. 7 grams of the dihydroxy compound was dissolved in 4 grams of sodium hydroxide in 75 cc. of water under an atmosphere of nitrogen. The mixture was stirred and heated to 158–167° F., and 7 grams of dimethyl sulfate were added dropwise. Heating was continued for ½ hour, the solution was made alkaline and then cooled. The product was extracted with ether, washed with dilute sodium bicarbonate solution and the ether then was evaporated. The residue was extracted with boiling hexane, and the product crystallized out of solution upon cooling. It was purified by further recrystallization. The product had a melting point of 179–182° F.

1,4-dihydroxy-5,8-ethano - tetrahydronaphthalene was prepared by reducing 1,4-dihydroxy-5,8-ethano-dihydronaphthalene. 4 grams of the dihydroxy-dihydro compound was suspended in methanol and then reduced at room temperature in the presence of Adams catalyst under 60 pounds per square inch hydrogen pressure. The solvent was evaporated, and the product was recrystallized from dilute methanol. The product had a melting point of 395–403° F. 1-hydroxy-4-methoxy-5,8-ethano-tetrahydronaphthalene was prepared by reducing the corresponding dihydronaphthalene in the manner described above. This product had a melting point of 276–280° F.

*Example I*

The gasoline used in this example was a caustic washed, thermally cracked gasoline which had a normal induction period of 65 minutes. 0.01% by weight of 1-hydroxy-4-methoxy-5,8-ethano-5,8 - dihydronaphthalene was incorporated in another sample of the gasoline and this served to increase the induction period of the gasoline to about 425 minutes.

*Example II*

The inhibitor of this example is 1-hydroxy-4-methoxy-5,8-ethano-5,6,7,8-tetrahydronaphthalene. When incorporated in a concentration of 0.01% by weight in another sample of the cracked gasoline described in Example I, the induction period of the gasoline was increased from 65 minutes to about 485 minutes.

*Example III*

The lard used in this example had a normal stability period of 4 hours as determined by the Swift test. This test is described in detail in the article by A. E. King, H. L. Roschen and W. H. Irwin, which appeared in Oil and Soap, pages 105–109, June 1933, and modified as described in the article by R. W. Reimenschneider, J. Turer and R. M. Spec, which appeared in Oil and Soap, pages 169–171, September 1943. In general, this test comprises bubbling air through a sample of the lard and reporting the number of hours until the lard develops a peroxide value of 20.

The inhibitor used in this example is 1,4-dihydroxy-5,8-ethano-5,8-dihydronaphthalene. It was incorporated in a concentration of 0.02% by weight in a sample of the lard and increased the stability period of the lard from 4 hours to 21.5 hours.

*Example IV*

The inhibitor used in this example is 1-hydroxy-4-methoxy-5,8-ethano-5,8-dihydronaphthalene. When incorporated in a concentration of 0.02% by weight in another sample of the lard described in Example III, the inhibitor served to increase the stability period of the lard from 4 hours to 21.5 hours.

*Example V*

The inhibitor used in this example is 1,4-dihydroxy-5,8-ethano-5,6,7,8-tetrahydronaphthalene. When incorporated in a concentration of 0.02% by weight in another sample of the lard described in Example III, this inhibitor increased the stability period of the lard from 4 hours to 26 hours.

*Example VI*

The inhibitor used in this example is 1-hydroxy-4-methoxy-5,8-ethano-5,6,7,8-tetrahydronaphthalene. When incorporated in a concentration of 0.02% by weight in another sample of the lard described in Example III, this inhibitor served to increase the stability period of the lard from 4 hours to 25 hours.

*Example VII*

This example illustrates the use of the inhibitor compound of the present invention in the stabilization of rubber. 1% by weight of 1-hydroxy-4-ethoxy-5,8-ethano-5,6,7,8-tetrahydronaphthalene is added to the latex produced by the emulsion-polymerization of butadiene and styrene, after which the latex is processed. The rubber

I claim as my invention:

1. A method of stabilizing an organic material selected from the group consisting of hydrocarbon distillate and fatty material normally subject to the oxidative deterioration which comprises incorporating therein an antioxidizing amount of an inhibitor selected from the group consisting of a 1,4-dihydroxy-5,8-ethano-hydronaphthalene and mono-ether thereof.

2. A method of stabilizing a hydrocarbon distillate normally subject to oxidative deterioration which comprises incorporating therein an antioxidizing amount of an inhibitor comprising a mono-ether of 1,4-dihydroxy-5,8-ethano-hydronaphthalene.

3. A method of stabilizing fatty material against oxidative deterioration in storage which comprises incorporating therein an antioxidizing amount of an inhibitor comprising 1,4-dihydroxy-5,8-ethano-hydronaphthalene.

4. A method of stabilizing fatty material against oxidative deterioration in storage which comprises incorporating therein an antioxidizing amount of an inhibitor comprising a mono-ether of a 1,4-dihydroxy-5,8-ethano-hydronaphthalene.

5. Organic material selected from the group consisting of hydrocarbon distillate and fatty material normally subject to oxidative deterioration containing, as an additive to retard said deterioration, an antioxidizing amount of an inhibitor selected from the group consisting of a 1,4-dihydroxy-5,8-ethano-hydronaphthalene and mono-ether thereof.

6. Organic material selected from the group consisting of hydrocarbon distillate and fatty material normally subject to oxidative deterioration containing, as an additive to retard said deterioration, an antioxidizing amount of an inhibitor comprising 1,4-dihydroxy-5,8-ethano-5,8-dihydronaphthalene.

7. Organic material selected from the group consisting of hydrocarbon distillate and fatty material normally subject to oxidative deterioration containing, as an additive to retard said deterioration, an antioxidizing amount of an inhibitor comprising an alkyl ether of 1,4-dihydroxy-5,8-ethano-5,8-dihydronaphthalene.

8. Organic material selected from the group consisting of hydrocarbon distillate and fatty material normally subject to oxidative deterioration containing, as an additive to retard said deterioration, an antioxidizing amount of an inhibitor comprising 1,4-dihydroxy-5,8-ethano-5,6,7,8-tetrahydronaphthalene.

9. Organic material selected from the group consisting of hydrocarbon distillate and fatty material normally subject to oxidative deterioration containing, as an additive to retard said deterioration, an antioxidizing amount of an inhibitor comprising a monoalkyl ether of 1,4-dihydroxy-5,8-ethano-5,6,7,8-tetrahydronaphthalene.

10. Hydrocarbon material normally subject to oxidative deterioration containing an antioxidizing amount of an inhibitor selected from the group consisting of a 1,4-dihydroxy-5,8-ethano-hydronaphthalene and mono-ether thereof.

11. Cracked gasoline normally subject to oxidative deterioration containing from about 0.0001% to about 1% by weight of 1-hydroxy-4-methoxy-5,8-ethano-5,8-dihydronaphthalene.

12. Cracked gasoline normally subject to oxidative deterioration containing from about 0.0001% to about 1% by weight of 1-hydroxy-4-methoxy-5,6,7,8-tetrahydronaphthalene.

13. Fatty material normally subject to oxidative deterioration containing an antioxidizing amount of an inhibitor selected from the group consisting of a 1,4-dihydroxy-5,8-ethano-hydronaphthalene and mono-ether thereof.

14. Lard normally tending to become rancid containing from about 0.001% to about 0.1% by weight of 1,4-dihydroxy-5,8-ethano-5,8-dihydronaphthalene.

15. Lard normally tending to become rancid containing from about 0.001% to about 0.1% by weight of 1-hydroxy-4-methoxy-5,8-ethano-5,8-dihydronaphthalene.

16. Lard normally tending to become rancid containing from about 0.001% to about 0.1% by weight of 1,4-dihydroxy-5,8-ethano-5,6,7,8-tetrahydronaphthalene.

17. Lard normally tending to become rancid containing from about 0.001% to about 0.1% by weight of 1-hydroxy-4-methoxy-5,8-ethano-5,6,7,8-tetrahydronaphthalene.

References Cited in the file of this patent
UNITED STATES PATENTS

| | | |
|---|---|---|
| 2,692,202 | Chenicek et al. | Oct. 19, 1954 |
| 2,801,928 | Thompson | Aug. 6, 1957 |